US009407084B2

(12) United States Patent
Jain et al.

(10) Patent No.: US 9,407,084 B2
(45) Date of Patent: Aug. 2, 2016

(54) OVER-VOLTAGE PROTECTION CIRCUIT

(71) Applicants: Mayank Jain, Ambala Cantt (IN); Sanjoy K. Dey, Noida (IN)

(72) Inventors: Mayank Jain, Ambala Cantt (IN); Sanjoy K. Dey, Noida (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 121 days.

(21) Appl. No.: 14/553,989

(22) Filed: Nov. 25, 2014

(65) Prior Publication Data

US 2016/0149391 A1    May 26, 2016

(51) Int. Cl.
*H02H 3/20*    (2006.01)
(52) U.S. Cl.
CPC ........................................ *H02H 3/20* (2013.01)
(58) Field of Classification Search
CPC ........................................................ H02H 3/20
USPC .......................................................... 361/91.5
See application file for complete search history.

(56) References Cited

U.S. PATENT DOCUMENTS

| 5,506,528 | A | * | 4/1996 | Cao ..................... H01L 27/0925 257/E27.065 |
| 5,784,231 | A | | 7/1998 | Majid |
| 5,864,226 | A | * | 1/1999 | Wang ...................... G05F 1/565 257/195 |
| 5,929,615 | A | * | 7/1999 | D'Angelo ............... G05F 1/618 323/222 |
| 6,940,703 | B1 | | 9/2005 | Kemp |
| 8,422,180 | B2 | | 4/2013 | Lin |
| 8,670,219 | B2 | | 3/2014 | Disney |
| 2008/0013237 | A1 | | 1/2008 | Moadel |
| 2011/0227635 | A1 | * | 9/2011 | Hashimoto ............ G01R 15/04 327/540 |
| 2013/0335873 | A1 | | 12/2013 | Lee |
| 2014/0192442 | A1 | * | 7/2014 | Guadiz .................... H02H 7/09 361/21 |

OTHER PUBLICATIONS

Texas Instruments, "ADS8517, 16-Bit, 200-kSPS, Low-Power, Sampling Analog to Digital Converter with Internal Reference and Parallel/Serial Interface", Datasheet SLAS527A, Jun. 2009.

* cited by examiner

*Primary Examiner* — Scott Bauer
(74) *Attorney, Agent, or Firm* — Charles E. Bergere

(57) ABSTRACT

An over-voltage protection circuit suitable for use at a front-end of an on-chip analog module such as an analog-to-digital converter (ADC) includes an input potential divider that can be disconnected from the module when the module is idle (or working on any other input such as the ADC sampling another channel causing the current channel to be idle) while still providing protection for front-end devices. A first NMOS transistor pair connects or disconnects the potential divider to or from ground in response to a control signal, and a second transistor pair including a NMOS transistor and a PMOS transistor ensures that the output does not rise above the supply voltage.

10 Claims, 1 Drawing Sheet

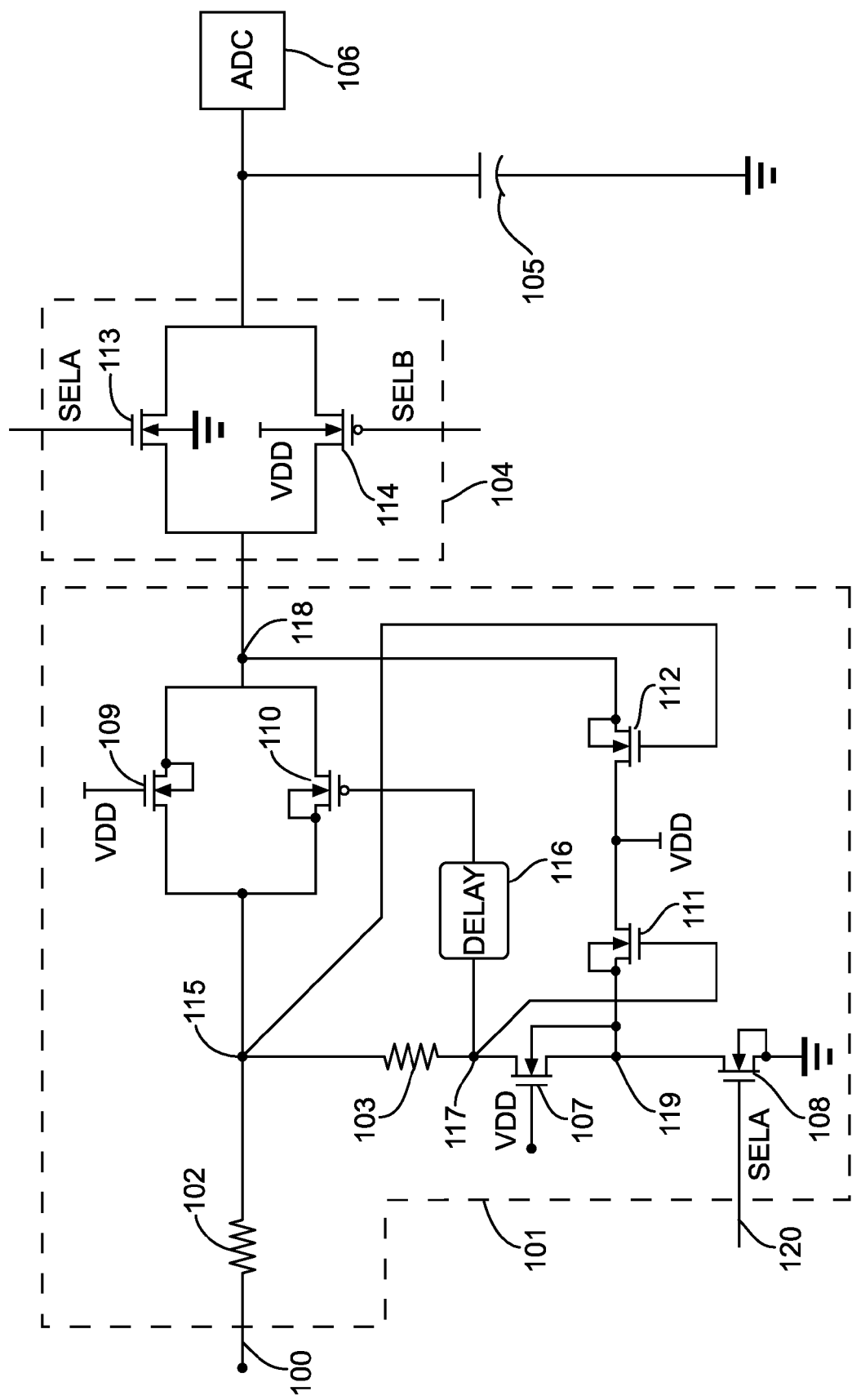

OVER-VOLTAGE PROTECTION CIRCUIT

BACKGROUND OF THE INVENTION

The present invention relates generally to over-voltage protection circuits suitable and, more particularly, to over-voltage protection of analog functional modules.

Analog functional modules, for example, an analog-to-digital converter (ADC) of a system on chip (SOC) device sometimes need to handle input voltages that exceed the voltage rating of the devices constituting the analog functional module. One known way of handling high analog input voltage ranges on a SOC incorporating devices with a lower rating employs a resistor divider network connected at the front end of the analog module. However, the resistor divider network constitutes a continuous load on the input, which results in inefficiency as, in the particular example of a multichannel ADC, one of the channels may be idle for some considerable time. Cutting-off the continuous loading of the divider network can overcome the inefficiency problem. However, in so doing, the functional module may see a high voltage at its input, which can affect reliability. Using comparatively high resistor values for the divider network will reduce the loading but, disadvantageously, increase RC time delays in the input path.

Hence it would be advantageous to provide a front-end circuit that can eliminate input loading without the drawbacks of the known arrangements while also providing input over-voltage protection.

BRIEF DESCRIPTION OF THE DRAWINGS

The invention, together with objects and advantages thereof, may best be understood by reference to the following description of preferred embodiments together with the accompanying drawings in which:

FIG. 1 is a schematic circuit diagram of an input circuit including over-voltage protection circuitry in accordance with an embodiment of the invention.

DETAILED DESCRIPTION OF PREFERRED EMBODIMENTS

The detailed description set forth below in connection with the appended drawings is intended as a description of presently preferred embodiments of the invention, and is not intended to represent the only forms in which the present invention may be practised. It is to be understood that the same or equivalent functions may be accomplished by different embodiments that are intended to be encompassed within the spirit and scope of the invention. In the drawings, like numerals are used to indicate like elements throughout. Furthermore, terms "comprises," "comprising," or any other variation thereof, are intended to cover a non-exclusive inclusion, such that module, circuit, device components, structures and method steps that comprises a list of elements or steps does not include only those elements but may include other elements or steps not expressly listed or inherent to such module, circuit, device components or steps. An element or step proceeded by "comprises . . . a" does not, without more constraints, preclude the existence of additional identical elements or steps that comprises the element or step.

In one embodiment, the present invention provides an over-voltage protection circuit having an input, an output, a potential divider connected to the input, a first switch arrangement connected to the potential divider and having a select input for receiving a select signal, and a second switch arrangement connected between the potential divider at a first node and the output and having a control input connected to the potential divider and the first switch arrangement at a second node. In a first mode of operation, the first switch arrangement enables the potential divider in response to receipt of a select signal and closes the second switch arrangement, thereby permitting a voltage at the first node to be transferred to the output at a third node. In a second mode of operation, in response to the select signal, the first switch arrangement disables the potential divider.

Referring now to FIG. 1, a circuit having an input 100 and which includes an over-voltage protection circuit 101 including a potential divider comprising first and second resistors 102, 103, is shown. An output of the over-voltage protection circuit 101 is coupled to a sampling switching circuit 104. A sampling capacitor 105 is connected between an output of the sampling switching circuit 104 and ground. In one embodiment, the circuitry 101-105 forms a front end of an Analog to Digital Converter (ADC) with the output of the sampling switching circuit 104 being fed to further conventional ADC circuitry 106. In one embodiment, the over-voltage protection circuit 101 is implemented in a SOC device that typically includes a plurality of other functional modules.

The over-voltage protection circuit 101 ensures that the input to the sampling switching circuit 104, and hence the ADC circuitry 106 is limited to a supply voltage VDD. The over-voltage protection circuit 101 also has the capability to disable the potential divider 102, 103 during an 'off' condition to be explained below.

The over-voltage protection circuit 101 includes a first switch arrangement including first and second switches, which in this example comprise first and second N channel metal oxide silicon field effect transistors (NMOSFET) 107 and 108 respectively, connected in series between the potential divider 102, 103 and ground serve to either connect or disconnect the potential divider to or from ground in response to a first select signal SELA. A second switch arrangement comprising third and fourth switches, which in this example comprise a third NMOSFET 109 and a P channel metal oxide silicon field effect transistor (PMOSFET) 110, connected in parallel with one another, serve to protect the input of the sampling switching circuit 104 from an over-voltage at the input 100. A third switch arrangement comprises fifth and sixth switches, which in this example comprise fourth and fifth NMOSFETs 111, 112 respectively, connected in series, that serve as additional protection devices to ensure none of the transistors comprising the over-voltage protection circuit 101 is subjected to voltages higher than its rating.

The sampling switching circuit 104 comprises seventh and eighth switches, which in this example comprise sixth and seventh MOSFETs 113, 114 connected in parallel and controlled by first and second select signals SELA and SELB respectively (where SELB is the opposite of SELA). The sixth MOSFET 113 is an NMOSFET and the seventh MOSFET 114 is a PMOSFET.

The circuitry of FIG. 1 will now be described in greater detail. A first terminal of the first resistor 102 receives an input voltage on line 100. A second terminal of the first resistor 102 is connected to a first terminal of the second resistor 103 at a first node 115. A second terminal of the second resistor 103 is connected to a first terminal of a delay circuit 116, a drain terminal of the first NMOSFET 107 and a gate terminal of the fourth NMOSFET 111 at a second node 117. In one example, the delay circuit 116 is a simple RC circuit. A second terminal of the delay circuit 116 is connected to a gate terminal of the PMOSFET 110. A source terminal of the PMOSFET 110 and a drain terminal of the third NMOSFET 109 are both connected to the first node 115. A gate terminal of the third NMOSFET 109 is connected to the supply voltage VDD. A source terminal of the third NMOSFET and a drain terminal of the PMOSFET 110 are both connected to a third node 118. Thus, a divided-down input voltage (appearing at the first node 115) is transferred to the second node 118, which serves as the input to the sampling switching circuit, by the NMOSFET-PMOSFET pair 109, 110 when the circuit of FIG. 1 in an 'on' condition.

A gate terminal of the first NMOSFET 107 is connected to the power supply VDD. A source terminal of the first NMOSFET 107 is connected to a drain terminal of the second NMOSFET 108 and a source terminal of the fourth NMOSFET 111 at a fourth nodal pint 119. A gate terminal of the second NMOSFET receives the first select signal SELA on line 120 which is generated elsewhere on the SOC. The SELA select signal can be generated by any appropriate logic function and SELA will be set high when it is required that a sample of the input voltage is to be taken, otherwise it will be set low. A source terminal of the second NMOSFET 108 is connected to ground. A drain terminal of the fourth NMOSFET 111 and a drain terminal of the fifth NMOSFET 112 are connected to the supply voltage VDD. A gate terminal of the fifth NMOSFET 112 is connected to the first node 115 and a source terminal of the fifth NMOSFET 112 is connected to the third node 118.

Also connected to the third node 118 are a drain terminal of the sixth MOSFET 113 and a source terminal of the seventh MOSFET 114. A source terminal of the sixth MOSFET 113 and drain terminal of the seventh MOSFET 114 are connected together and to the first terminal of the sampling capacitor 105 and to the ADC circuitry 106. A gate terminal of the sixth MOSFET 113 receives the first select signal SELA. A gate terminal of the seventh MOSFET 114 receives the second select signal SELB which is generated elsewhere on the SOC. The SELB select signal is the logical inverse of SELA and can be derived from the SELA select signal by simple logic circuitry. A body terminal of the sixth NMOSFET 113 is connected to ground. A body terminal of the seventh MOSFET 114 is connected to the supply voltage VDD.

In an 'on' operating condition where a voltage on input line 100 is required to be sampled, the select input SELA is set high (that is, at VDD) and the select input SELB is set low (that is, at ground potential). Hence the first and second NMOSFETs 107, 108 are both ON, discharging the second node 117 to ground. Thus, a path exists between the input line 100 and ground through the potential divider 102, 103 and a divided voltage appears at the first node 115. The setting of the input SELA to VDD also means that the fourth and fifth NMOSFETs 111, 112 are OFF. Also, the gate of the PMOSFET 110 is pulled down, thereby turning the PMOSFET 110 ON. (It will be noted that the gate of the third NMOSFET 109 is always pulled up to VDD). So with both the third NMOSFET 109 and the PMOSFET 110 conducting, the input signal appearing at the first node 115 is transferred to the third node 118 via the PMOSFET 110 and the third NMOSFET 109. The third NMOS FET 109 ensures efficient transfer of low voltages. PMOSFETs are, in general, not so reliable in such cases. The setting of the select input SELA to VDD and the select input SELB to ground switches on both the sixth and seventh MOSFETs 113, 114 which comprise the sampling switching circuit 104. Thus, the divided input voltage is further transferred to sampling capacitor 105 (and the ADC circuitry 106). Preferably, the third NMOSFET 109, the PMOSFET 110, the sixth MOSFET 113 and the seventh MOSFET 114 (which is a P channel MOSFET) are sized to ensure that the (dynamic) voltage appearing at the first node 115 is precisely transferred to the sampling capacitor 105.

In an alternative operating condition where it is required that the potential divider 102, 103 be disconnected, (that is, an ADC 'off' condition) the first select signal SELA is set to ground and the second select signal SELB is set to VDD. Once SELA goes low and SELB goes high, the second NMOSFET 108 is turned OFF, removing the potential divider's link to ground. Also when the circuit is in the 'off' condition, as the PMOSFET 110 is OFF and the third NMOSFET 109 has its gate terminal fixed at VDD, no voltage greater than VDD can be transferred from the first node 115 to the third node 118. Also in the 'off' condition, if the input on line 100 rises above VDD then the fifth NMOSFET 112 turns ON, limiting the voltage at the third node 118 to VDD. In addition, both sixth and seventh MOSFETs 113, 114 comprising the sampling switching circuit 104 are turned OFF by SELA going low and SELB going high. So the potential divider 102, 103 and the over-voltage protection circuit 101 are cut off from the ADC circuitry 106. However, the change in state of SELA causes the fourth and fifth NMOSFETs 111, 112 to turn ON. As a consequence, the third and fourth nodes 118, 119 are forced to a predetermined voltage which is limited to VDD. Forcing the third and fourth nodes 118, 119 to a predetermined voltage during this 'off' mode of operation, ensures that none of the NMOSFETs or the PMOSFET comprising the over-voltage protection circuit 101 is subjected to a voltage higher than its rating.

The first and second nodes 115, 117 rise to the level of the input voltage (on line 100). This latter occurrence however can adversely affect reliability of the first and third NMOSFETS 107, 109 and the PMOSFET 110. In order to obviate this, the first NMOSFET 107 has its gate terminal connected to VDD and its source terminal is also connected to VDD through the fourth NMOSFET 111. Thus the first NMOSTFET 107 is protected from any over-voltage appearing at the input on line 100 up to twice its rating. The third NMOSFET 109 is similarly protected as its gate terminal is also connected to VDD and its source terminal is connected to VDD through the fifth NMOSFET 112. To protect the PMOSFET 110 from over-voltage conditions, its gate terminal is arranged to be connected to the input 100 when the circuit is in the 'off' condition (that is, the potential divider is disconnected) and connected to ground when in the input circuit 100 is in the 'on' condition, (that is when the potential divider is connected). As the gate terminal of the P NOSFET 110 is connected (via the delay circuit 116) to the second node 117, this gate terminal will receive the voltage appearing on the input line 100 when the input circuit is in the 'off' condition. The source terminal of the PMOSFET 110 also receives the voltage appearing on the input line 100 in the 'off' condition and so the source-to-gate voltage is zero. When the select input SELA on line 120 goes from low to high (and the potential divider 102, 103 is connected), the circuit is in the 'on' condition and the second node 117 is pulled to ground as is the gate terminal of the PMOSFET 110 via the first and second NMOSFETs 107, 108. However, the source terminal of the P NMOSFET 110 (which is connected to the first node 115) will remain at the input level for some period of time while the potential divider 102, 103 settles. This can cause a source-to-gate voltage spike which could go above the rating of the PMOSFET 110. The provision of a delay (which can be chosen to be small in terms of MOSFET parameters) between the gate terminal of the PMOSFET 110 and the second node 117 prevents any spike being generated.

It will be understood that while the example of FIG. 1 describes an analog-to-digital function, the over-voltage protection circuit 101 may be used with other analog functional modules.

Advantageously, the present invention enables shut-down of front-end resistor divider loading while protecting front-end devices from over-voltage and without losing operating condition precision.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

The description of the preferred embodiments of the present invention has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the spirit and scope of the present invention as defined by the appended claims.

The invention claimed is:

1. An over-voltage protection circuit, comprising:
   an input;
   an output;
   a potential divider connected to the input;
   a first switch arrangement connected to the potential divider and having a select input for receiving a first select signal (SELA);
   a second switch arrangement connected between the potential divider at a first node and the output, and having a control terminal connected to the potential divider and the first switch arrangement at a second node; and
   a delay circuit connected between the control terminal of the second switch arrangement and the second node,
   wherein in a first mode of operation, the first switch arrangement enables the potential divider in response to receipt of the first select signal and closes the second switch arrangement, such that a voltage at the first node is transferred to the output at a third node, and in a second mode of operation, in response to the first select signal, disables the potential divider.

2. The over-voltage protection circuit of claim 1, further comprising a third switch arrangement connected between the first switch arrangement and the output, for turning on in the second mode of operation, thereby clamping the output at the third node to a fixed voltage level.

3. The over-voltage protection circuit of claim 1, wherein, the potential divider comprises:
   two resistors each having first and second terminals, a first terminal of the first resistor serving as the input to the over-voltage protection circuit and a second terminal of the second resistor serving as the second node, and the second terminal of the first transistor and the first terminal of the second transistor being connected together at the first node, and
   the first switch arrangement comprises:
   a first transistor having a drain terminal connected to the second node and a gate terminal connected to a power source, and
   a second transistor having a source terminal connected to ground, a gate terminal for receiving a first select signal, and a drain terminal connected to a source terminal of the first transistor at a fourth node,
   and the second switch arrangement comprises:
   a third transistor having a drain terminal connected to the first node and a gate terminal connected to the power source, and
   an opposite polarity transistor of polarity opposite to the first, second and third transistors and having a source terminal connected to the first node, a gate terminal connected to the second node, and a drain terminal connected to the source terminal of the third transistor at the third node.

4. The over-voltage protection circuit of claim 3, wherein the delay circuit is connected between the gate terminal of the opposite polarity transistor and the second node.

5. The over-voltage protection circuit of claim 3, further comprising:
   a fourth transistor having a source terminal connected to the fourth node, a gate terminal connected to the second node, and a drain terminal connected to the power source; and
   a fifth transistor having a source terminal connected to the third node, a gate terminal connected to the first node, and a drain terminal connected to the power source.

6. The over-voltage protection circuit of claim 5, wherein the fourth and fifth transistors are N channel metal oxide semiconductor field effect transistors.

7. The over-voltage protection circuit of claim 5, further comprising:
   a voltage sampling circuit connected to receive the output at the third node, the voltage sampling circuit comprising:
   sixth and seventh transistors of opposite polarity type that are connected together in parallel, the sixth transistor having a gate terminal for receiving the first select signal and a body terminal connected to ground, and the seventh transistor having a gate terminal for receiving a second select signal having a polarity opposite to that of the first select signal, and a body terminal connected to the power source.

8. The over-voltage protection circuit of claim 7, wherein the sixth transistor is an N channel metal oxide semiconductor field effect transistor and the seventh transistor is a P channel metal oxide semiconductor field effect transistor.

9. The over-voltage protection circuit of claim 3, wherein the first, second and third transistors are N channel metal oxide semiconductor field effect transistors.

10. The over-voltage protection circuit of claim 9, wherein the opposite polarity transistor is a P channel metal oxide semiconductor field effect transistor.

* * * * *